U. S. HUGGINS.
GAME.
APPLICATION FILED NOV. 14, 1919.
1,346,826.
Patented July 20, 1920.
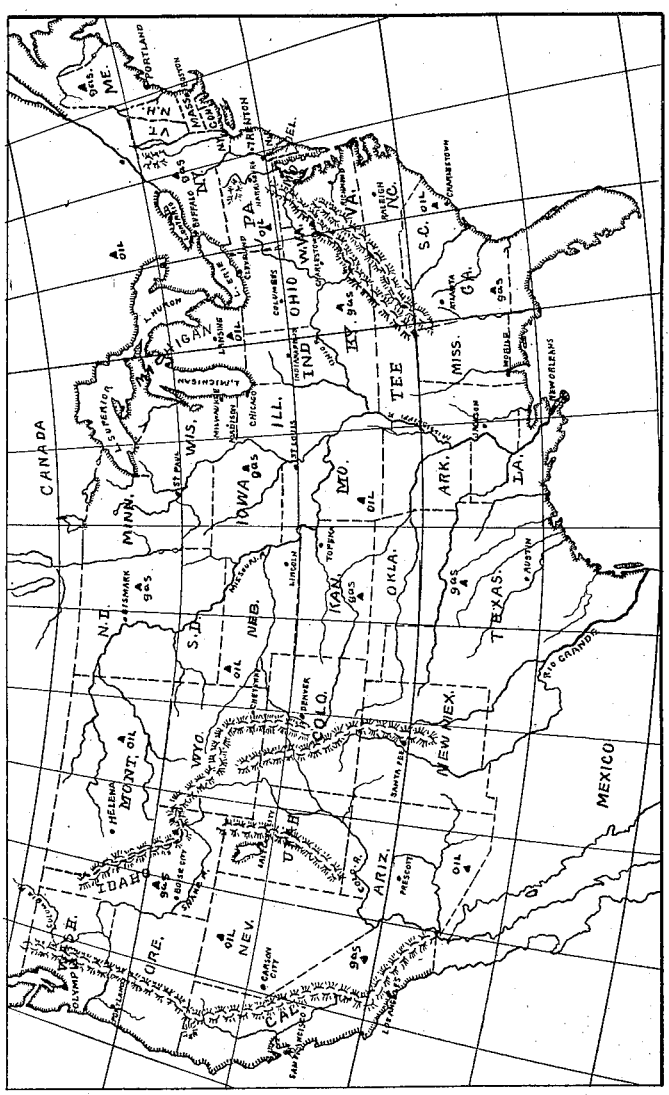

UNITED STATES PATENT OFFICE.

ULYSSES S. HUGGINS, OF CHICAGO, ILLINOIS.

GAME.

1,346,826.  Specification of Letters Patent.  Patented July 20, 1920.

Application filed November 14, 1919. Serial No. 338,092.

*To all whom it may concern:*

Be it known that I, ULYSSES S. HUGGINS, a citizen of the United States, and resident of Chicago, in the county of Cook and State of Illinois, have invented certain new and useful Improvements in Games, of which the following is a specification.

My invention relates to games and particularly to a novel game, the satisfactory playing of which requires geographical knowledge.

One of the principal and important objects of my invention is to provide a game which may be played by adults as well as children, in which the element of chance has been somewhat reduced and in place of which I have substituted the requirement for mental application and independent geographical knowledge. In my game the guiding or controlling cards, the selection of which constitutes the sole element of chance, do not, as in the games with which I am familiar, result in a repetition of moves or the application of the same knowledge in any two cases. Thus there is endless variety and the game will not grow old or tiresome until the players have reached such state of knowledge respecting the country delineated on the map as to make it purely a game of chance.

The game is played by employing a conventional map of a country, kingdom, principality or state, on which there is delineated the usual subdivisions, cities, rivers, mountains, etc. Associated with the map are a plurality of objects preferably in the form of physical representations of a motor-driven device, such as an automobile, aeroplane, etc. I also employ a plurality of cards of pasteboard or similar material, these being selected because of the ease with which they may be mixed and drawn as required. On one face of each card is printed a direction regarding movement of a vehicle under the control of the player. These directions will be in such language that no movement of the vehicle is possible unless the player can from his own knowledge supply the information required by the printed directions. For instance, the directions on the card drawn may read; "Follow the sun across two states to the capital city of the next state. Name states and cities visited." It will be seen that before the player can advance on his journey he must supply certain information, the accuracy of which will be verified from the map by the opposing player.

In addition to the geographical features I prefer to inject a certain element of chance relating to the well known requirements of motor vehicle travel; that is, the necessity for motor fluid and lubricating oil, stations where these necessities may be obtained being indicated at random on the map and certain of the cards indicating a lack of supply and requiring a visit to the nearest station.

The invention will be more readily understood by reference to the accompanying drawings, wherein:

Figure 1 is a reproduction of a conventional map of the United States, the principal cities, rivers and points of interest being indicated thereon together with stations for gas and oil;

Fig. 2 is a reproduction of a plurality of miniature automobiles, one of which is selected by each player, and, Fig. 3 represents collectively, a number of specimen cards, the number and variety of the directions on which is limited only by the ingenuity of the producer of the game.

My map will, as stated, designate the capital and principal cities of the different states and they will be referred to hereinafter without applying other designating characters thereto. The map will also bear designations of stations for gas and oil at separated points. The lines of longitude and latitude and their proper degree markings will also appear, together with the surrounding waters and principal inland lakes. Some of the cards, such as indicated in Fig. 3, will contain instructions such as the following; "Proceed 280 miles on your course and state how many degrees of longitude this covers." In order to entitle the player to move he must know that there are 360 degrees of longitude, that the earth is 25,000 miles in circumference and that therefore each degree corresponds to approximately 70 miles. Correspondingly, the degree of latitude representing 0 degrees at the equator to 90 degrees at the poles must be known together with the number of miles represented by each degree of latitude before the player can move in case he draws a card the controlling element of which requires knowledge of latitude.

In addition, there should be directions relating to the inland navigable waters, their rise, mouth, direction of flow and junction with other streams. The point of emergence into the ocean will also be utilized in the direction cards, such as the following; "Proceed to the nearest city on a navigable stream, place your car on board a boat and sail to a seaport at the mouth of the stream, naming the stream, the city at which you board the boat and the seaport.

It will be noted from the limited synopsis heretofore given that the requirement of the same direction card may never be met by the supplying of the same information in one or more instances as the knowledge required in order to meet the requirements of the card depend entirely upon the location of the vehicle of the player at the time the card is drawn. Therefore it will be noted that the game presents infinite variety with a sufficient element of chance in order to take the game out of the class of study and make it play; nevertheless it requires an accurate fund of geographical knowledge, the storing of the information being accomplished with a minimum of effort.

The game differs from those heretofore proposed in several important points, the leading one of which has been heretofore emphasized, that of substituting accurate geographical knowledge for the element of chance. I am aware that games have been proposed in which a map of conventional form has been employed and with which a representation of a vehicle has been associated. However, in each instance with which I am familiar, the movement of the vehicle has been along certain designated or specified routes, the movement on the route being designated by chance by a spinning pointer, dice or cards, leaving no mental effort for the player except that of following the directions as given. In my game a distinct mental effort must be made in order to accomplish any advance.

In playing the game each player will select one of the physical representations of the vehicle in which he is supposed to travel. The map is placed before the players and each player selects preferably a port either on the Atlantic or Pacific Coast, and designates a port on the opposite coast to which he intends to journey. The cards bearing the questions or instructions are shuffled or mixed and each player in turn draws a card. As the card is drawn he reads it and the other player or players check or verify the knowledge given by the first player in answer to the question propounded by the card which he has drawn. If he correctly gives the required information his piece may be moved accordingly. This continues until one player reaches his destination. In order to avoid too great length to a game I prefer to employ a few cards containing a designation such as the following: "If you can bound the state you are now in, then proceed direct to your destination." One or more of these cards distributed throughout the pack makes certain the winning of the game by some one before all the cards are drawn.

Obviously the map employed may be that of different countries or it may be a plane map of the whole world. It might to advantage be a map of a single state in which the counties, towns, cities, rivers and points of interest are illustrated in detail, in which case the cards employed will require information as to the local geography as distinguished from that of the nation.

Furthermore, the form of the vehicle is unimportant, the vehicle preferably being selected with which a large number of people are familiar such as the automobile. These and other modifications are comprehended within the scope of my invention.

I claim:

1. In a game, the combination with a map of conventional form, of a plurality of objects representing a power-propelled device adapted for movement on said map, one of said devices being provided for each player, and a plurality of devices having thereon directions for controlling the movement of said power-propelling device, said directions being adapted to be carried out by the application of independent geographical knowledge thereto, the selection of said direction devices by the different players being controlled by chance.

2. In a game, the combination of a map containing geographical indicia and also indicia representing stations for the supply of motor fluid, a plurality or representations of motor-driven vehicles, one for each player, and a plurality of direction cards adapted to be intermixed and drawn in sequence by chance by each player, and movement controlling directions on said cards, certain of said directions requiring mental effort and geographical knowledge, and others of said directions requiring travel to designated stations for the supply of motor fluid, substantially as described.

Signed at Chicago, Illinois, this 11th day of November, 1919.

ULYSSES S. HUGGINS.

Witness:
B. M. STEIGER.